(12) United States Patent (10) Patent No.: US 7,464,081 B2
McKinley et al. (45) Date of Patent: Dec. 9, 2008

(54) WEB BASED DYNAMIC DATA TRANSLATION SERVICE AND METHOD

(75) Inventors: James Michael McKinley, Rocklin, CA (US); Timothy Joseph Kane, Roseville, CA (US); Stephen Poole, San Jose, CA (US); Tammy Nguyen, San Jose, CA (US); Wahome Muchiri, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 471 days.

(21) Appl. No.: 10/823,370

(22) Filed: Apr. 12, 2004

(65) Prior Publication Data

US 2006/0031584 A1 Feb. 9, 2006

(51) Int. Cl.
*G06F 17/30* (2006.01)
(52) U.S. Cl. ................ 707/4; 707/10; 709/203
(58) Field of Classification Search .......... 707/1–5, 707/10, 200; 709/203
See application file for complete search history.

(56) References Cited

U.S. PATENT DOCUMENTS

| | | | | |
|---|---|---|---|---|
| 7,216,072 | B2* | 5/2007 | Kasai et al. ............ | 704/8 |
| 2004/0102956 | A1* | 5/2004 | Levin ................. | 704/2 |
| 2005/0267738 | A1* | 12/2005 | Wilkinson et al. ....... | 704/9 |

* cited by examiner

*Primary Examiner*—Cheryl Lewis

(57) ABSTRACT

A method and system of translating data from a first format into one or more translated formats includes initiating a translation request on one of plurality of client systems. The translation request includes source data to be translated from the first format into desired translated formats and configuration data defining each type of translation to be performed on the source data. The translation request is communicated to a server system and is processed on the server system to determine from the configuration data the type of each data translation to be performed on the data. The data is provided to an appropriate translation service on the server system and is translated to the appropriate translated format via the corresponding translation service. A return translation request is communicated to the client system, the return translation request including the data in each translated format.

27 Claims, 5 Drawing Sheets

WEB BASED DYNAMIC DATA TRANSLATION SERVICE AND METHOD

BACKGROUND OF THE INVENTION

Many large companies today have computer infrastructures that are made up of hundreds and sometimes thousands of computer systems running just as many application programs. In many situations, these myriad application programs need to share data and communicate with each other. To share data and messages among these applications programs, it is many times required to convert or translate data and messages in a first format utilized by a first application program into a second format utilized by a second application program. The data and messages in the first format may in fact need to be converted into multiple formats for use by another application program or programs, although in the following description translation from a first format to a second format will be described for ease of explanation. The term data translation will be used in the following description to refer to the translation of any type of information from one form to another form or forms, such as the translation of data, messages, programming instructions, and so on.

Programmers have typically written translation programs to perform the required translations on an as needed or "project-by-project" basis. When application programs executing a particular business process require data translation, a programmer performs a translation evaluation and then selects and implements a translation technology to meet the immediate translation requirement for that process. For example, extensible style language transformations (XSLT) may need to be done to transform extensible markup language (XML) files in one form to XML documents in another form. A programmer would select and implement a suitable XSLT translation engine in this situation.

While the traditional approach of customized translation systems meets the immediate needs for a business process requiring data translation, the approach leads to inefficient utilization of enterprise resources for a variety of reasons. One such reason is that custom translation systems typically result in duplicate customized implementations and infrastructures, with each being developed independently and requiring independent support organizations having the specialized knowledge and skills required to maintain each translation system. Another reason is that this approach may create numerous problems when migrating from existing translation tools to new technologies due to proprietary protocols and processes used by each translation system. Ideally industry standards and technologies would be utilized to eliminate the creation of customized systems and the associated legacy issues created thereby.

There is a need for a translation system and method that eliminates the need for creating individual custom translation systems and allows for enterprise wide use of the implemented translation system.

SUMMARY OF THE INVENTION

According to one aspect of the present invention, a method and system of translating data from a first format into one or more translated formats includes initiating a translation request on one of plurality of client systems. The translation request includes source data to be translated from the first format into one or more translated formats and configuration data defining each type of translation to be performed on the source data. The translation request is communicated to a server system and is processed on the server system to determine from the configuration data the type of each data translation to be performed on the data in the first format. The data in the first format is provided to a translation service on the server system corresponding to each determined type of data translation, and the data in the first format is translated to the appropriate translated formats on the server system via each translation service. A return translation request is communicated to the client system, the return translation request including the data in the translated formats.

DETAILED DESCRIPTION OF PREFERRED EMBODIMENTS

Figure 1:
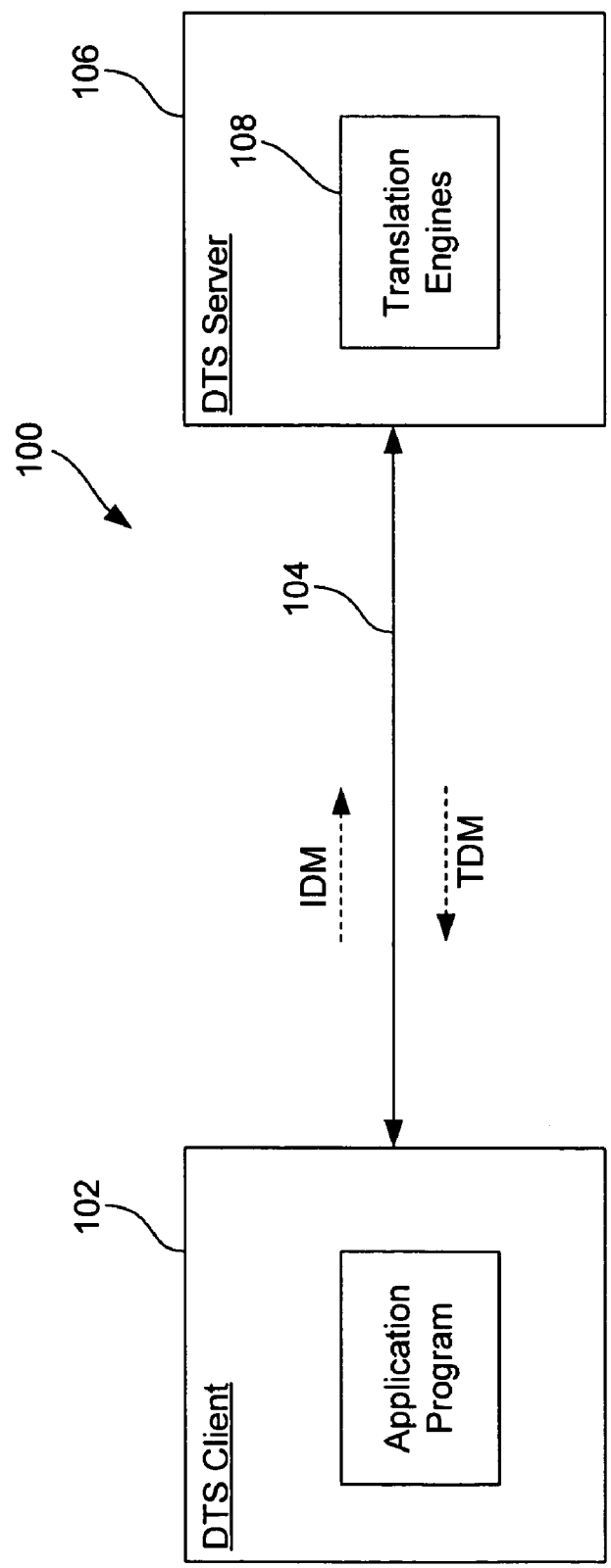
FIG. 1 is a functional block diagram of a Web based data and message translation system 100 according to one embodiment of the present invention.

FIG. 1 is a functional block diagram of a Web based dynamic translation service (DTS) system 100 according to one embodiment of the present invention. The system 100 includes a dynamic translation service (DTS) client system 102 that communicates input data messages IDM containing source data to be translated and configuration data defining the desired translation over a communications network 104 to a DTS server system 106. The DTS server system 106 receives the IDM message and supplies the corresponding source data to an appropriate one of a plurality of translation engines 108 based upon the configuration data in the message. The translation engine 108 translates the source data into target data having the desired format, and thereafter includes the target data in a translated data message TDM that is communicated over the communications network 104 to the DTS client system 102. In one embodiment, the IDM and TDM messages are XML messages that are communicated over the communications network 104 according to a suitable network protocol, such as the Transmission Control Protocol/Internet Protocol (TCP/IP), although different message formats and protocols may be utilized, as will be understood by those skilled in the art.

The system 100 allows client systems 102, only one of which is shown in FIG. 1, to invoke translations of desired source data whenever required. Moreover, the DTS server system 106 includes the translation engines 108 to perform all required data translations, with translation engines being added or deleted as required by the client systems 102. Each client system 102 could, for example, correspond to a separate business group or division of a particular enterprise. The system 100 centrally locates the translation functionality on the DTS server system 106, which enables a single group to support and maintain this functionality. The translation engines 108 would typically perform translations according to adopted industry standards, eliminating the need for custom systems and processes and simplifying support and updating of the translation functionality. The system 100 thus leverages an initial investment in standard translation tools by making these tools available enterprise wide, and creates abstraction between source applications and target applications so that source applications can be independently added and then can make use of the translation tools as required instead of integrating translation tools into the development of the new applications.

In the present description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all of the components or process operations of any of the respective described embodiments may also be within the scope of the present invention although not expressly described in detail below. Finally, the operation of well known components and/or processes has not been shown or described in detail below to avoid unnecessarily obscuring the present invention.

Figure 2:
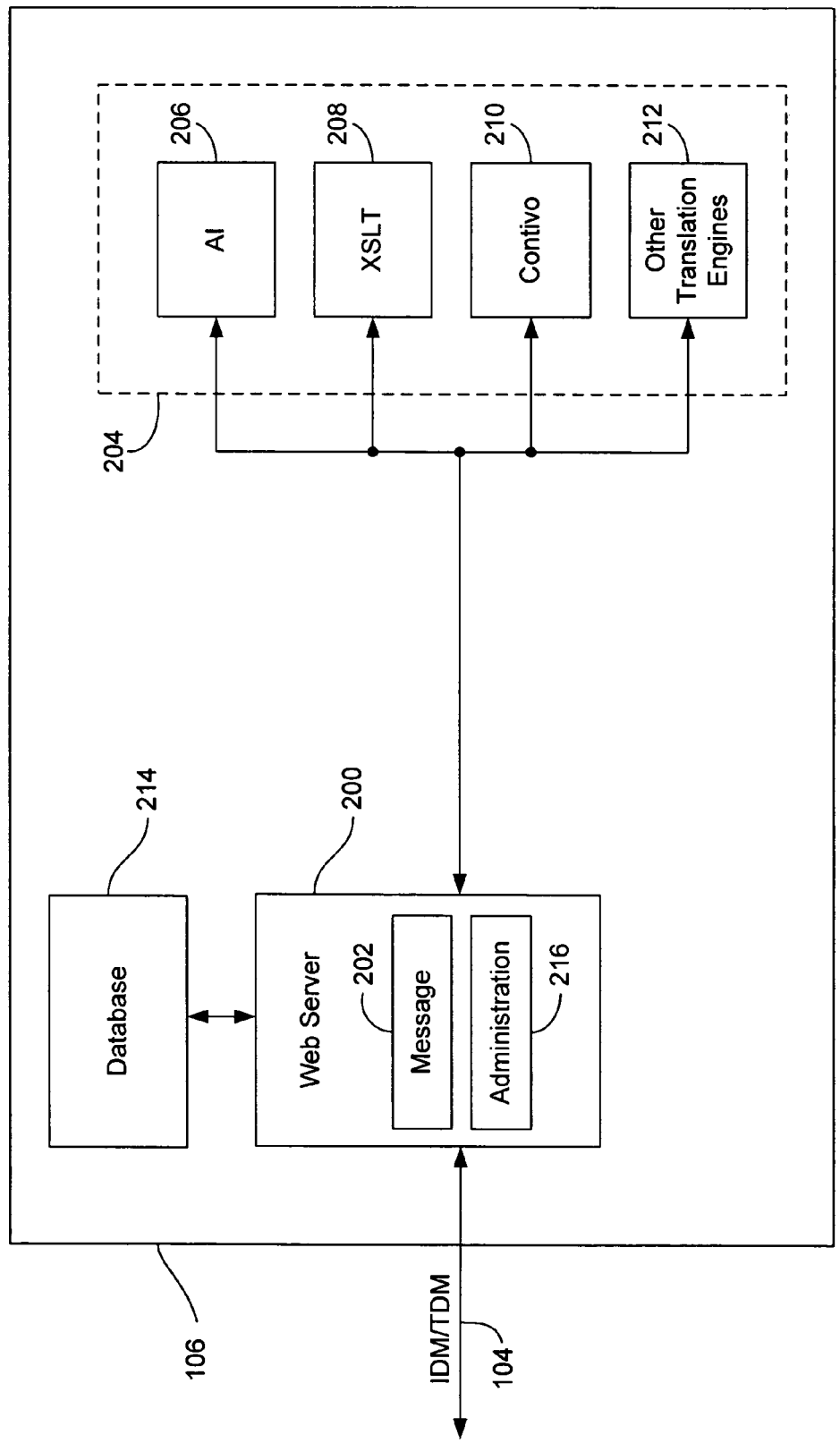
FIG. 2 is a more detailed functional block diagram of the DTS server system of FIG. 1 according to one embodiment of the present invention.

FIG. 2 is a more detailed functional block diagram of the DTS server system 106 of FIG. 1 according to one embodiment of the present invention. The DTS server system 106 includes a Web server component 200 that provides an interface to the DTS client systems 102 and may perform other functions such as load-balancing, as will be understood by those skilled in the art. The Web server 200 includes a message component 202 that receives the IDM messages and parses these messages to put them in the proper form required by a corresponding one of a number of translation engines 204 that translate source data portions of received IDM messages. In the example the embodiment of FIG. 2, the translation engines 204 include an Application Integrator (AI) translation engine 206, an XSLT translation engine 208, and a Contivo translation engine 210, each of which operates to translate supplied source data from the message component 202 in a manner that will be understood by those skilled in the art. The DTS server system 106 may further include additional translation engines for performing other translations of the source data from received IDM messages, with these additional translation engines being designated 212 in FIG. 2.

The message component 202 utilizes the configuration data portion of the IDM message to retrieve required steps for the data translation being performed from a DTS database 214. The DTS database 214 stores these translation steps for the various data translations that may be performed by the DTS server system 106, along with log information regarding the translations performed and security information that is utilized to grant or deny a client system 102 access to the server system. In response to the source data from the message component 202, the appropriate translation engine 206-212 translates the received source data to generate corresponding target data and returns this target data to the message component. The message component 202 thereafter generates an XML message containing the target data to thereby generate the TDM message that is communicated back to the client system 102 that initially supplied the IDM message to the server system 106.

The Web server component 200 further includes an administration component 216 that provides remote access to the DTS server system 106 to allow support personnel to remotely maintain and update the server system. For example, support personnel may remotely access the server system 106 via the administration component 216 to modify or update the database 214. This allows support personnel to maintain and update the server system 106 without being physically located in the same place as the server system.

In operation, a DTS client system 102 requiring a data translation supplies an IDM message to the Web server component 200, where the IDM message is an XML message containing source data to be translated and configuration data regarding the specifics of the translation to be performed. The message component 202 processes the received IDM message including retrieving the required translation steps from the database 214 and processing the configuration data to determine the translation to be performed. Based on the configuration data, the message component 202 retrieves required translation information from the database 214 and provides this translation information along with the source data to be translated to the appropriate translation engine 206-212. In response to the received source data and translation information from the message component 202, the appropriate translation engine 206-212 translates the source data to thereby generate corresponding target data and returns this target data to the message component 202. The message component 202 develops an XML message containing the target data, which corresponds to the TDM message, and communicates this message to the DTS client system 102 initially supplying the IDM message. In this way, the DTS client system 102 obtains the desired translated source data in the form of the target data.

Figure 3:
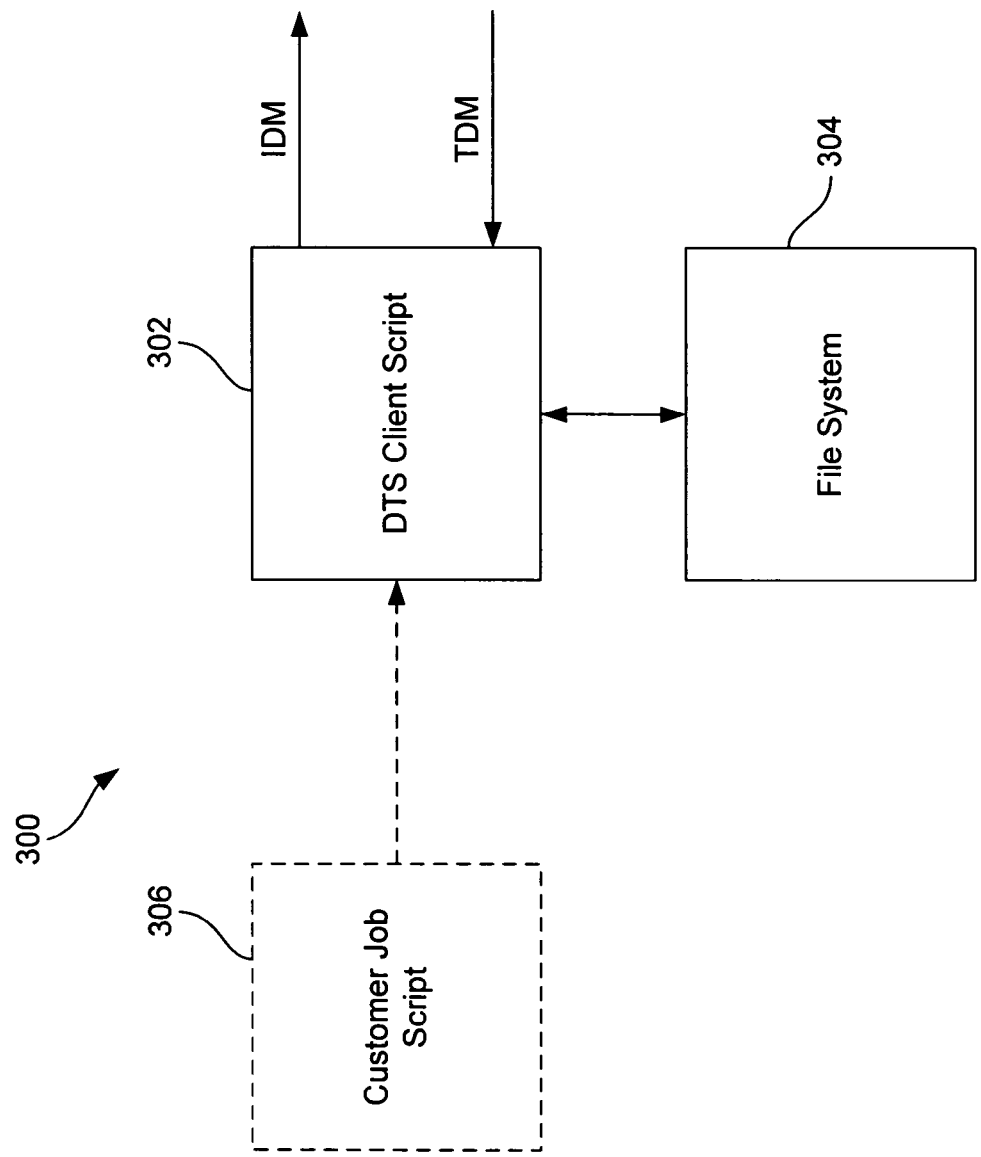
FIG. 3 is a more detailed functional block diagram of the DTS client system of FIG. 1 according to one embodiment of the present invention.

FIG. 3 is a more detailed functional block diagram of a DTS client system 300 corresponding to one embodiment of the client system 102 of FIG. 1. The DTS client system 300 is an example of a command-line embodiment in which a user of the client system invokes a DTS client script 302 to initiate translation of desired source data. The user supplies required parameters to the DTS client script 302 when invoking script. These parameters would typically include an input file name corresponding to the file containing the source data to be translated along with translation information about the type of translation to be performed on the source data and an output filename to which the translated data in the form of the target data received from the DTS server system 106 of FIG. 2 is stored. The client script 302 communicates with a file system 304 to retrieve the input file and store the output file. In operation, the DTS client script 302 utilizes the input file and translation information to generate the IDM message and communicate this message to the DTS server system 106. The script 302 thereafter receives the TDM message from the server system 106 containing the target data corresponding to the translated source data and stores this target data in the designated output file in the file system 304. A customer job script 306 on the client system 300 may be developed by a customer to invoke the DTS client script 302 according to another embodiment of the client system.

Figure 4:
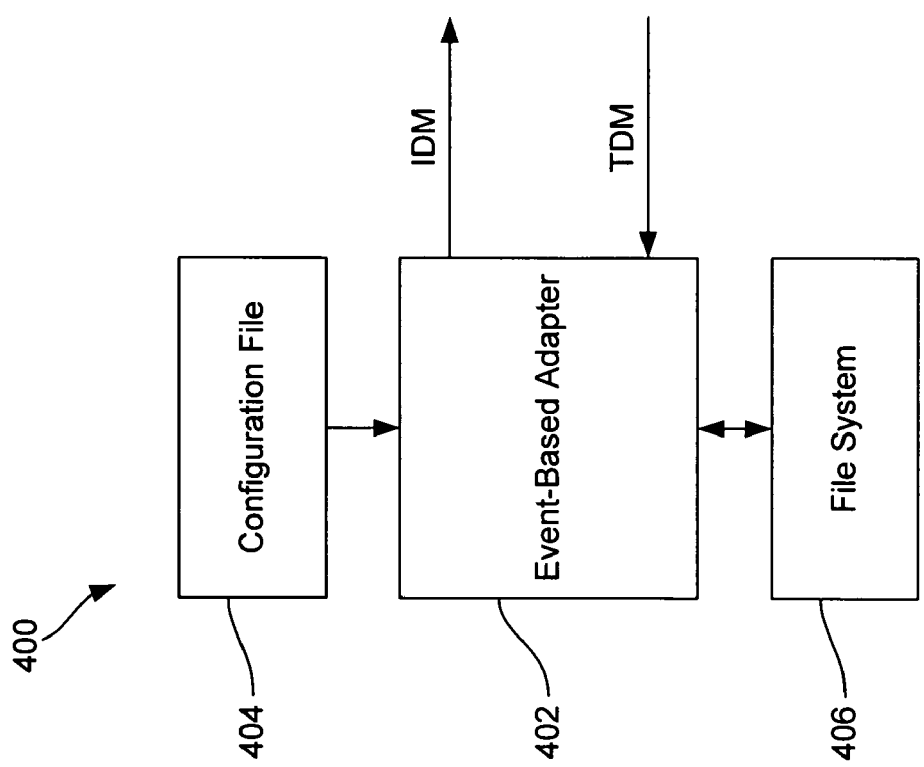
FIG. 4 is a more detailed functional block diagram of the DTS client system of FIG. 1 according to another embodiment of the present invention.

FIG. 4 is a more detailed functional block diagram of a DTS client system 400 including an event-based adapter 402 that enables a user of the client system to periodically translate designated input files without requiring the user to manually invoke the DTS client script 302 as previously described with reference to the embodiment of FIG. 3. A configuration file 404 stores information designating files stored in a file system 406 that contain source data that the user would like to automatically translate on a periodic or other basis. The configuration file 404 also stores configuration information regarding the type of data translation to be performed on each of the designated files. For example, the configuration file 404 could store a list of file names and the event-based adapter 402 could periodically, such as once a day, initiate data translations for these files. Alternatively, the event-based adapter 402 could monitor the files designated in the configuration file 404 and initiate data translations for these files only when a change in the files is detected. In operation, the event-based adapter 402 monitors the designated files stored in the file system 406 according to the criteria defined by the configuration file 404. When the event-based adapter 402 determines that a designated file is to be translated, the event-based adapter generates an appropriate IDM message containing the corresponding source data and communicates this message to the DTS server system 106. The event-based adapter 402 thereafter receives the TDM message from the server system 106 containing the target data corresponding to the translated source data and stores this target data in the designated output file in the file system 406.

Figure 5:
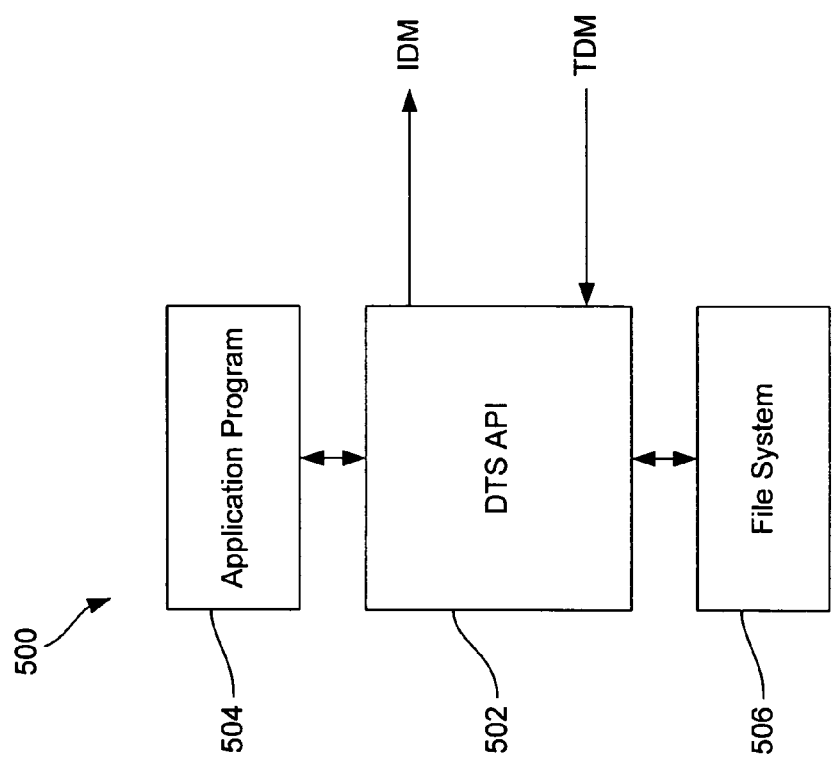
FIG. 5 is a more detailed functional block diagram of the DTS client system of FIG. 1 according to a further embodiment of the present invention.

FIG. 5 is a more detailed functional block diagram of a DTS client system 500 including a DTS application program interface (API) 502 that communicates with an application program 504 running on the client systems. The API 502 operates to provide the application program 504 with required data translations. In operation, the application program 504 calls the API 502 as required to perform data translations on designated files. The application program 504 supplies an input file name corresponding to the file containing the source data to be translated along with translation information about the type of translation to be performed on the source data and an output filename to which the translated data in the form of the target data received from the DTS server system 106 (FIG. 2) is to be stored. The input and output files are stored in a file system 506. When called by the application program 504, the API 502 obtains the designated input file for the file system 506 and generates an appropriate IDM message containing the corresponding source data for the input file. The API 502 communicates the IDM message to the DTS server system 106 (FIG. 2) and thereafter receives the TDM message from the server system containing the target data corresponding to the translated source data, and stores this target data in the designated output file in the file system 506.

Even though various embodiments and advantages of the present invention have been set forth in the foregoing description, the above disclosure is illustrative only, and changes may be made in detail and yet remain within the broad principles of the present invention. Moreover, the functions performed by the components described in the various embodiments of the client system 102 and server system 106 can be combined to be performed by fewer elements, separated and performed by more elements, or combined into different functional blocks depending upon the actual implementation of the dynamic translation service system 100, as will be appreciated by those skilled in the art. Therefore, the present invention is to be limited only by the appended claims.

What is claimed is:

1. A method of translating data from a first format into one or more translated formats, the method comprising:
    initiating a translation request on one of a plurality of client systems, the translation request being initiated on a periodic basis or upon detection of a change in source data on one or more of the client systems, and the translation request including the source data to be translated from the first format into the one or more translated formats and configuration data defining each type of translation to be performed on the source data;
    communicating the translation request to a server system;
    processing the received translation request on the server system to determine from the configuration data each type of data translation to be performed on the source data in the first format;
    providing the source data in the first format to a corresponding translation service on the server system corresponding to each determined type of data translation to be performed;
    translating the source data in the first format to generate target data in a corresponding translated format on the server system via the corresponding translation service;
    communicating a return translation request to the client system, the return translation request including the target data in the corresponding translated format; and
    storing the target data in a designated output file in the client system.

2. The method of claim 1 wherein the translation request and the return translation request comprise XML messages.

3. The method of claim 1 wherein the translation services comprise a group of translation services that include an Application Integrator, XSLT, and Contivo translation service.

4. The method of claim 1 wherein initiating a translation request on one of plurality of client systems comprises executing a client script on the client system and providing at least input file, output file, and translation type information to the client script.

5. The method of claim 1 wherein initiating a translation request on one of plurality of client systems comprises running an event-based adapter on the client system to automatically translate data in defined files on the client system.

6. The method of claim 1 wherein initiating a translation request on one of plurality of client systems comprises generating a translation call from an application program running on the client system and providing the application call to an application program interface running on the client system, the application program interface initiating the translation request.

7. A method of translating data from a first format into one or more translated formats, the method comprising:
    receiving on a server system a translation request from a client system, the translation request being received on a periodic basis or upon detection of a change in source data contained in the translation request, the translation request including the source data to be translated from the first format into one or more translated formats and configuration data defining each type of translation to be performed on the source data;
    processing the received translation request on the server system to determine from the configuration data each type of data translation to be performed on the source data in the first format;
    providing the source data in the first format to a corresponding translation service on the server system corresponding to each determined type of data translation to be performed;
    translating the source data in the first format to generate target data in the translated formats on the server system via each corresponding translation service;
    generating a return translation request including the target data in the translated format; and
    storing the target data in a designated output file in the client system.

8. The method of claim 7 wherein the translation request is received from one of a plurality of client systems.

9. The method of claim 7 wherein generating a return translation request including the data in the translated formats comprises communicating the return translation request to a client system.

10. The method of claim 7 wherein the translation request and the return translation request comprise XML messages.

11. The method of claim 7 wherein the translation services comprise a group of translation services that include an Application Integrator, XSLT, and Contivo translation service.

12. A method of translating data from a first format into one or more translated formats, the method comprising:
   initiating a translation request on a client system, the translation request being initiated on a periodic basis or upon detection of a change in source data on the client system, and the translation request including source data to be translated from the first format into one or more translated formats and configuration data defining each type of translation to be performed on the source data;
   receiving a return translation request on the client system, the return translation request including target data in each translated format corresponding to the configuration data in the translation request; and
   storing the target data in a designated output file in the client system.

13. The method of claim 12 wherein the translation request and the return translation request comprise XML messages.

14. The method of claim 12 wherein initiating a translation request comprises executing a client script on the client system and providing at least input file, output file, and translation type information to the client script.

15. The method of claim 12 wherein initiating a translation request comprises running an event-based adapter on the client system to automatically translate data in defined files on the client system.

16. The method of claim 12 wherein initiating a translation request comprises generating a translation call from an application program running on the client system and providing the application call to an application program interface running on the client system, the application program interface initiating the translation request.

17. A computer-readable storage medium having stored thereon a program which, when executed on a client system, translates data from a first format into one or more translated formats by performing the operations of:
   initiating a translation request on the client system, the translation request being initiated on a periodic basis or upon detection of a change in source data on the client system, and the translation request including source data to be translated from the first format into one or more translated formats and configuration data defining each type of translation to be performed on the source data;
   receiving a return translation request on the client system, the return translation request including target data in each translated format corresponding to the configuration data in the translation request; and
   storing the target data in a designated output file in the client system.

18. The computer-readable medium of claim 17 wherein the medium comprises an optical disk.

19. The computer-readable medium of claim 17 wherein initiating a translation request comprises executing a client script on the client system and providing at least input file, output file, and translation type information to the client script.

20. The computer-readable medium of claim 17 wherein initiating a translation request comprises running an event-based adapter on the client system to automatically translate data in defined files on the client system.

21. The computer-readable medium of claim 17 wherein initiating a translation request comprises generating a translation call from an application program running on the client system and providing the application call to an application program interface running on the client system, the application program interface initiating the translation request.

22. A computer system, comprising:
   at least one translation engine, each translation engine operable to translate data in a first format to data in a corresponding translated format; and
   an interface component adapted to receive periodic translation requests from one of a plurality of client systems, each translation request including source data to be translated from the first format into one or more translated formats and configuration data defining each type of translation to be performed on the source data, the interface component operable to determine from the configuration data each type of data translation to be performed on the source data aid to apply corresponding translation requests including the source data to the appropriate translation engines, and further operable to receive corresponding translated data from the translation engines to which translation requests were provided and to develop a return translation request including the translated data,
   wherein the translated data is stored in a designated output file in one of the client systems.

23. The computer system of claim 22 further comprising a translation database and wherein the interface component utilizes the configuration data portion of the translation request to retrieve required steps for the data translation being performed from the database.

24. The computer system of claim 22 wherein the translation request and the return translation request comprise XML messages.

25. The computer system of claim 22 wherein the application engines comprise translation engines for providing translation services that include an Application Integrator, XSLT, and Contivo translation service.

26. A computer network, comprising:
   a server system, comprising:
      at least one translation engine, each translation engine operable to translate data in a first format to data in a corresponding translated format; and
      an interface component adapted to receive a translation request including source data to be translated from the first format into one or more translated formats and configuration data defining each type of translation to be performed on the source data, the interface component operable to determine from the configuration data each type of data translation to be performed on the source data and to apply corresponding translation requests including the source data to the appropriate translation engines, and further operable to receive corresponding translated data from the translation engines to which translation requests were provided and to develop a return translation request including the translated data; and
   at least one client system, each client system operable to communicate translation requests to the server system either periodically or upon detection of a change in source data stored on the client system, each translation request including the source data to be translated from the first format into the one or more translated formats and including the configuration data defining each type of translation to be performed on the source data, and each client system operable to receive return translation requests from the server system containing target data in each translated format corresponding to the configuration data in the translation request, and store the tax-Ret data in a designated output file in the client system.

27. The computer network of claim 26 wherein each of the client systems and the server system is operable to develop translation requests and return translation requests, respectively, comprising XML messages.

* * * * *

UNITED STATES PATENT AND TRADEMARK OFFICE
CERTIFICATE OF CORRECTION

| | | |
|---|---|---|
| PATENT NO. | : 7,464,081 B2 | Page 1 of 1 |
| APPLICATION NO. | : 10/823370 | |
| DATED | : December 9, 2008 | |
| INVENTOR(S) | : James Michael McKinley et al. | |

It is certified that error appears in the above-identified patent and that said Letters Patent is hereby corrected as shown below:

In column 6, line 63, in Claim 7, delete "format;" and insert -- formats; --, therefor.

In column 8, line 21, in Claim 22, delete "aid" and insert -- and --, therefor.

In column 9, line 5, in Claim 26, delete "tax-Ret" and insert -- target --, therefor.

Signed and Sealed this
Twenty-ninth Day of March, 2011

David J. Kappos
*Director of the United States Patent and Trademark Office*